United States Patent [19]

Jäkel

[11] Patent Number: 4,969,089

[45] Date of Patent: Nov. 6, 1990

[54] METHOD OF OPERATING A COMPUTER SYSTEM AND A MULTIPROCESSOR SYSTEM EMPLOYING SUCH METHOD

[75] Inventor: Hans-Jürgen Jäkel, Underhaching, Fed. Rep. of Germany

[73] Assignee: Force Computers GmbH, Munich, Fed. Rep. of Germany

[21] Appl. No.: 117,015

[22] Filed: Nov. 4, 1987

[30] Foreign Application Priority Data

Mar. 2, 1987 [DE] Fed. Rep. of Germany ....... 3706734

[51] Int. Cl.⁵ ............................................. G06F 15/16
[52] U.S. Cl. ................................ 364/200; 364/228.3; 364/232.7; 364/232.9; 364/240.1
[58] Field of Search ... 364/200 MS File, 900 MS File; 371/38

[56] References Cited

U.S. PATENT DOCUMENTS

| | | | |
|---|---|---|---|
| 4,141,067 | 2/1979 | McLagan | 364/200 |
| 4,394,731 | 7/1983 | Flusche et al. | 364/200 |
| 4,479,814 | 1/1989 | Brenza | 364/200 |
| 4,785,394 | 11/1988 | Fischer | 364/200 |
| 4,791,641 | 12/1988 | Hillis | 371/38 |
| 4,797,815 | 1/1989 | Moore | 364/200 |

Primary Examiner—Raulfe B. Zache
Attorney, Agent, or Firm—Townsend and Townsend

[57] ABSTRACT

A computer constructed in accordance with the invention includes at least one transmitting and two receiving structural components. At least the receiving structural components are connected with one another by connecting lines that are arranged in parallel with one another. These connecting lines include data lines and also addressing lines by which each of at least the receiving structural components can be uniquely addressed. When addressed by the appropriate addressing signal, the respective receiving structural component reads the data that is then present at the data lines. A decoder is provided in the transmitting structural component. This decoder is operative for decoding the addressing lines which respectively address the receiving structural components in such a manner that simultaneous addressing of several structural components is possible. The receiving structural components are connected with one another and with the transmitting structural component by a common feedback line.

18 Claims, 2 Drawing Sheets

METHOD OF OPERATING A COMPUTER SYSTEM AND A MULTIPROCESSOR SYSTEM EMPLOYING SUCH METHOD

BACKGROUND OF THE INVENTION

The present invention relates to computers in general, and more particularly to a method of operating a computer system and to a multiprocessor system which employs such method.

There have already been proposed various methods for use in systems including at least one structural component which initiates the data transfer and at least two receiving structural components for coordinating and assuring data transfer from the structural component that had initiated the data transfer to the receiving structural components. Particular problems are encountered when, at a later point in time, an originally receiving structural component is to be capable of initiating the transfer of data, and a structural component which had originally initiated the transfer of data is to be capable of receiving the data being transferred.

Such problems are encountered, for example, in multiprocessor systems. In this context, it is to be mentioned that there are huge differences between so-called network systems and true multiprocessor systems. In network systems, there has been proposed a multitude of different solutions, of which the so-called C SMA-CD method and the token-passing method are the methods that are known best. What is common to these two methods is that only one structural component is able to transmit and only one structural component is able to receive at any given instant of time. However, as a result of the high speed of transmission in the network, there is created the impression that the data transmission is simultaneous, when the time requirements are not too critical. In the C SMA-CD method, the structural component that is ready to transmit data initially examines whether or not any other transmission is already taking place. If the transmission paths are free, the transmission starts at once. If a conflict or collision nevertheless arises between two transmissions, both of such transmissions are interrupted and a new attempt at transmission is made. The time instant at which the transmission is attempted again is determined by a random number generator. In this manner, it is intended to reduce the possibility or probability that a conflict or collision would occur again between the two restarted transmissions. In performing the token-passing method, a defined bit pattern is passed from one of the structural components to the next. A structural component that is ready to transmit takes the token over and thus indicates the transmission path as being occupied. The data to be transmitted are attached to the token and transmitted to a receiving structural component. The token is transported from one of the structural components to another within a predetermined time grid.

These methods cannot be used in the aforementioned true multiprocessor systems which are usually spatially rigidly connected with one another, inasmuch as they could result in a time behavior that would be critical in the real time domain. Furthermore, expensive measures must be resorted to when two structural components, which can consist, for instance, of input/output modules or of processor modules, are to receive the available data simultaneously. Under these circumstances, there are usually being used time-staggered transmissions, wherein the transmission control proper is performed, for example, by a module capable of directly accessing a register, which is also known as the DMA module. It is further known to utilize in true multiprocessors so-called bus-arbiter modules in order to avoid clashes or collisions between the transmission when more than one structural module is ready to transmit.

A further problem resides in the fact that the receiving structural component is not capable to receive data at any arbitrarily chosen instant of time. For this reason, there must be conducted testing for the occurrence of transmission errors. One solution to this problem would be to conduct the transmission in an interrupt-controlled fashion. However, in systems including at least two processors, this approach requires that the software which is already very close to hardware must be of such a type as to be reentrant; this requires an increased programming expenditure. Moreover, the number of the possible interrupt lines is, as a rule, limited. Therefore, when it is desired that a greater number of the structural components than that of the available interrupts is to be capable of receiving simultaneously, it is no longer possible to utilize this method.

Furthermore, there is known from a book by Andrew S. Tannenbaum entitled "Structured Computer Organization", Prentice-Hall Inc., Englewood Cliffs, N.J., 1984, especially from pages 103 to 110, and from a book by Walter A. Triebel and Avtar Singh entitled "16 Bit Microprocessors", Prentice-Hall Inc., Englewood Cliffs, N.J., 1985, especially pages 317 to 339, a method and a processor system in which a structural component that initiates the transfer of data transfers such data to individually addressable receiving structural components, wherein the accomplishment of the data transfer is acknowledged by a feedback signals. However, the addressing of the receiving structural components must take place at different times, since otherwise clashes would occur in the bus system between the individual transmissions.

SUMMARY OF THE INVENTION

Accordingly, it is a general object of the present invention to avoid the disadvantages of the prior art.

More particularly, it is an object of the present invention to provide a method of transmitting data from one structural component to another, and especially to a plurality of structural components, which method does not possess the drawbacks of the known methods of this type.

Still another object of the present invention is to devise a method of the type here under consideration which would render it possible to achieve parallel data transmission to such a plurality of receiving structural components.

It is yet another object of the present invention to develop a processor system capable of performing the above method.

A concomitant object of the present invention is so to construct the system of the above type as to be relatively simple in construction, inexpensive to manufacture, easy to use, and yet reliable in operation.

In keeping with these objects and others which will become apparent hereafter, one feature of the present invention resides in a method of transferring data between structural components, especially those of a multiprocessor system, wherein the structural components are capable of initiating the data transfer and are capable of being activated by an unique addressing signal, wherein the structural component which initiates the transfer of data transfers the data to a plurality of other structural components, wherein the addressing signals for the addressing of the respective receiving structural component are supplied to a bus system by the structural component that initiates the data transfer, and wherein each receiving structural component issues at least one feedback signal after the conclusion of the data transfer about the data transfer that has occurred. The method of the present invention comprises the steps of simultaneously addressing a plurality of the receiving structural components, simultaneously supplying the data issued by the structural component that has initiated the data transfer to the thus addressed receiving structural components; and logically coupling the feedback signals of all of the receiving structural components and supplying the result to the structural component that had initiated the data transfer.

It is particularly advantageous when the feedback signal is issued by each of the receiving structural components within a time period that is determined by the bus system when the data transfer was successful. This time period advantageously is between 30 and 100 ns. According to another aspect of the invention, the respective receiving structural component stores an error indication in a storage register thereof when such receiving structural element is unable to issue the feedback signal in time, and the contents of the storage register can be read by the other structural components, especially by the structural component which has initiated the data transfer. The respective receiving structural element advantageously issues an error signal within a predetermined time period when the data transfer is unsuccessful.

It is further advantageous when the addressing signals of the bus system that are not needed for addressing the structural components are used for addressing subunits of the receiving structural components. Advantageously, the structural component that initiates the data transfer is also capable of being used as a receiving structural component, and at least a portion of the respective receiving structural component is also capable of being used as a structural group that initiates the data transfer. The feedback signal is advantageously issued at the earliest at a predetermined time instant occurring after the occurrence of a data clock signal which is issued by the structural component that initiates the data transfer after it has reliably presented at least the addressing signals at an output system thereof, the predetermined time instant occurring after the expiration of a predetermined time period during which the respective receiving structural component is capable of issuing an error signal in the event that an error is encountered. The just mentioned predetermined time instant advantageously occurs 200 ns after the issuance of the data clock signal, and the just mentioned predetermined time period amounts to 150 ns.

According to another concept of the present invention, there is provided a multiprocessor system of the type including at least one structural component capable of initiating the transfer of data, and at least two structural components capable of receiving the data being transferred, wherein the structural components are connected with one another by a bus system that includes data lines, addressing lines via which each addressable structural component is capable of being uniquely addressed so that the respective receiving structural component that is addressed by its addressing signal reads the data presented at the data lines of the bus system, and a feedback line leading from the respective receiving structural component to the structural component that had initiated the data transfer. Such as system then includes, in accordance with the invention, means in the structural component that initiates the data transfer for simultaneously supplying the addressing signals to a plurality of the addressing lines and through the latter to the associated structural components to activate the latter, and means including the feedback line for connecting the respective receiving structural components with one another and with the structural component that had initiated the data transfer. The connecting means may incorporate one of the open collector and tristate technology.

Advantageously, the receiving structural components include respective buffer storage registers which temporarily store all the data within a short period of time after the stabilization of the data signals. The aforementioned period of time may amount to 40 ns. It is also advantageous when the receiving structural components include buffer storage registers from which the data can be immediately retrieved, or buffer storage registers each of which includes several stages and which initially issues the data received thereby first and subsequently issues the data received thereby later. It is especially advantageous when the multiprocessor system includes at least two identically constructed receiving structural components, especially processor units, whose activity is synchronized by the simultaneously received data signals.

The aforementioned feature of the present invention which resides in the fact that it is possible simultaneously to control the operation of several receiving structural components results in an advantage that the transmission to all of the receiving structural components in fact takes place simultaneously. This offers special advantages when various processors are to be synchronized with respect to one another, inasmuch as a time delay does not come into being when using the present invention already as a result of the transmission of the input data.

In accordance with the invention, the testing of the transmission is accomplished by means of the feedback signal DTACK. This feedback signal is present at each of the receiving structural components as an output signal, and additionally at each of the structural components that initiates the data transfer as an input signal. In performing the method of the present invention, the individual feedback signals are simply superimposed with one another. Herein, it is possible to utilize various tristate driving devices if such use is permitted by the various bus specifications. However, it is especially advantageous to utilize open-collector driving circuits the use of which is permitted by the VME bus specification. Such open-collector devices render it possible for the structural component that has initiated the data transfer to detect an error, provided that an error is present anywhere in the system. As a result of the superimposition of the feedback signals, there is obtained, owing to the technology being used, a logic combination.

The feedback signal is presented within a time frame of the synchronized transmission. In this manner, it is possible to achieve high speeds especially during the reading of connected data blocks. The identification of the receiving structural component at which a transmission error has been encountered is achieved by means of an error signal "Bus Error" (BERR). Herein, the address of the encountered the error can be automatically stored in a buffer storage register of the structural component at which the error had occurred, so that the structural component that had initiated the data transfer need repeat only the erroneous transmission. This buffer storage register must be capable of being read by the structural component that had initiated the data transfer. What is further particularly advantageous is the synchronization of the feedback signal DTACK with respect to the data clock signal DS. In this context, there exists the possibility to operate the data bus in a multiplexed manner, so that there exist, for instance, two data clock signals DSA and DSB. The system according to the invention further possesses a high degree of tolerance for running time differences in the region of the data signals, so that it is also possible to operate with a multiplexed data bus. Herein, the running time differences which come into existence due to the demultiplexing do not have any negative effects.

Furthermore, it is also possible for the system to tolerate data clock signals within a certain dispersion bandwidth, despite the use of a predetermined time frame.

The data are transferred at the very latest 40 ns after the data clock signal DS has been switched on When the result of the decoding is positive, the feedback signal DTACK is issued, but no sooner than 200 ns after the issuance of the data clock signal DS.

When no successful transmission has been accomplished, the error signal BERR must be issued and the reference address must be stored in a storage device which can be read by the structural component that had initiated the data transfer. This must occur at the latest 150 ns after the issuance of the data clock signal DS, so that there still be a sufficient safety time reserve prior to the earliest time instant at which the feedback signal DTACK can be issued.

The structural component which initiates the data transfer may further issue an address signal, by means of which it is possible to control the differentiation between various priorities of the data to be transmitted.

BRIEF DESCRIPTION OF THE DRAWING

The present invention will be described below in more detail with reference to the accompanying drawing in which.

DETAILED DESCRIPTION OF THE PREFERRED EMBODIMENT

Figure 1:
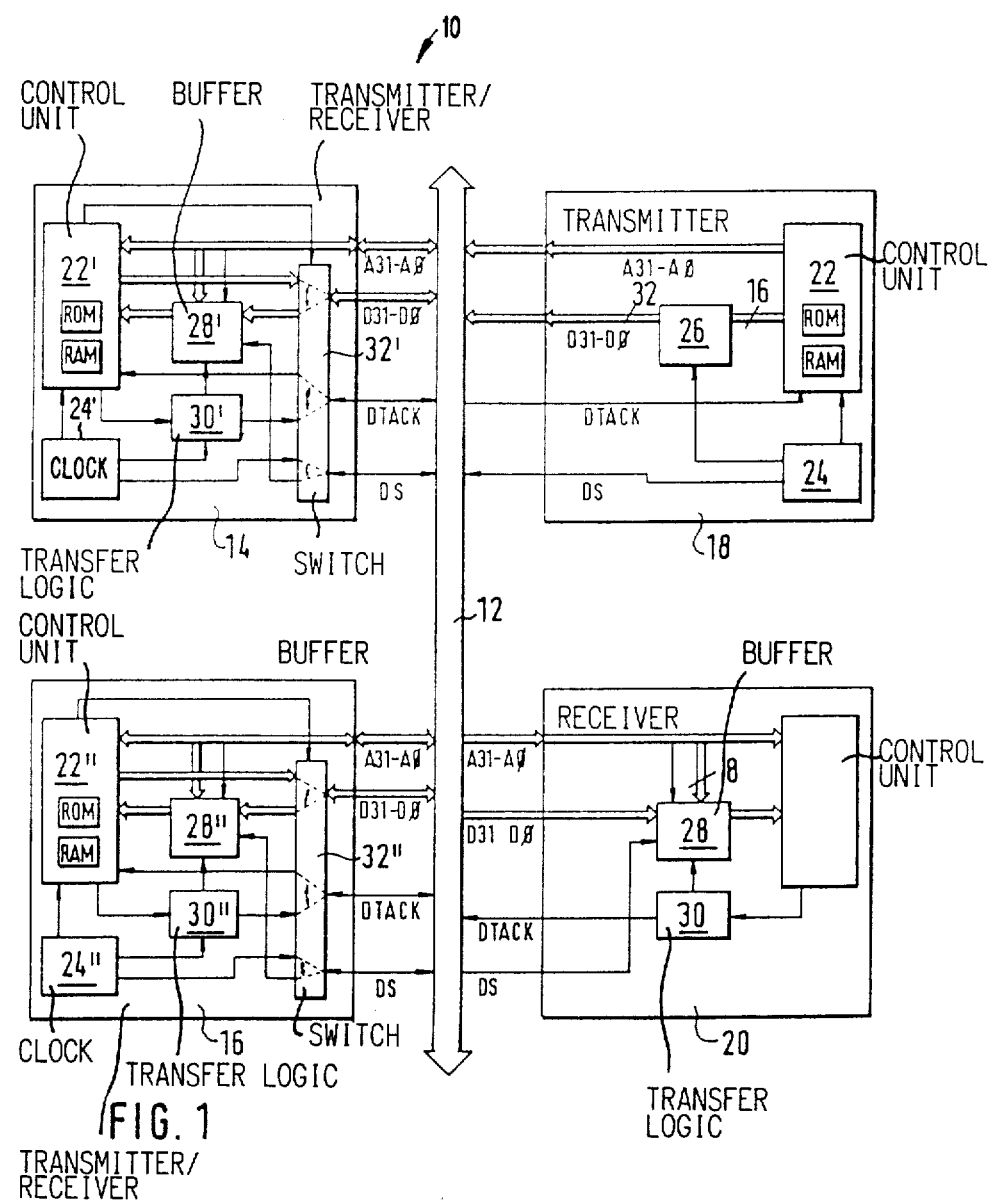
FIG. 1 is a considerably simplified block diagram of a computer system that is capable of operating in accordance with the present invention.

Referring now to the drawing in detail, and first to FIG. 1 thereof, it may be seen that the reference numeral 10 has been used therein to identify a computer according to the present invention in its entirety. The computer 10 includes many parts and components, of which only those that are relevant and needed for understanding the present invention are shown in FIG. 1. The computer 10 is arranged around a bus 12 which provides an electrically conductive connection between and among the various structural components or modules of the computer 10. A structural component 14 which is suited for operation both in the transmitting mode and in the receiving mode is connected to the bus 12. A further structural component 16, which corresponds the structural component 14, is also connected to the bus 12. In the illustration of FIG. 1 of the drawing, it will be assumed that the structural component 14 is the module which initiates the transfer of data, while the structural component 16 is the module which receives the data. The structural component or module which initiates the transfer of data will be referred to in the following as the transmitting structural component or module. A further structural component 18 is constructed merely as a transmitting module and, in the situation illustrated in FIG. 1 of the drawing, it will be assumed that it is not active. A still further structural component 20 is constructed merely as a receiving module. This structural component 20 receives the data signals issued by the structural component 14 simultaneously with the structural component 16.

In a practical implementation, the bus 12 is constituted by a mother board which includes twenty-one insertion possibilities or receptacles for the various structural components or modules, including those specifically mentioned above, each of which is constructed or configured as an insertable plate or element. Thus, at most twenty-one structural components, such as one transmitting structural component and at most twenty receiving structural components, can be used in such a system.

The structural component 18 which is constructed for operation in the transmitting mode has a minimum configuration, that is, it includes merely a control unit 22, for instance a microprocessor, which is connected with addressing lines A31 to A0, with data lines D31 to D0, and with a feedback line DTACK. All of these lines A31 to A0, D31 to D0, and DTACK are included in the bus 12 and are available to each of the structural components, such as to the structural components 14, 16, 18 and 20. The time sequence of the individual signals appearing at these lines A31 to A0, D31 to D0, and DTACK is controlled by a clock generator 24. The clock generator 24 controls a multiplexing structural element 26 which alternatingly connects the half of the data lines D31 to D0 which carries the most significant bits and the other half of the data lines D31 to D0 which carries the least significant bits with the control unit 22. The clock generator 24 issues its clock signal in synchronism with the switching-over of the multiplexing structural element 26, and this clock signal is supplied through the bus 12 to the respective receiving structural components. Furthermore, the feedback line DTACK is directly connected with the control unit 22, so that a feedback signal that appears on the feedback line DTACK is supplied to the control unit 22.

The control unit 22, on its part, has a construction that is in itself well known. Besides the control arrangement proper, that is, the microprocessor, there is further provided a read/write or ready access memory (RAM) and a permanent or read-only memory (ROM). In addition to the control lines indicated in FIG. 1 of the drawing, there may be further provided a plurality of additional control lines, as well as input/output lines for the connection of peripheral equipment, all of such lines being connected with the control unit 22.

The structural component 20 is constructed merely as a receiving module. In the illustrated implementation, there is provided an intermediate or buffer storage 28. The buffer storage 28 is constructed as a shift register having a width of 32 bits. This means that the data which are entered into the buffer storage 28 first also leave this buffer storage 28 first. The data which are issued by the buffer storage 28 are then further processed. The processing unit which performs this further processing allows the writing of further data into the buffer storage 28, as a result of the operation of a transfer logic element 30, only when the buffer storage 28 is capable of receiving the incoming data. The transfer logic element 30 further issues the feedback signal to the feedback line DTAC. To the buffer storage 20, there is further connected a data clock line DS which supplies to the buffer storage 30 a data clock signal that determines the instant of data transfer. The activation of a receiving structural component, such as 20, is achieved via the addressing lines A31 to A0, wherein one addressing line serves for the activation of the buffer storage 28 and, in a manner which is not illustrated in the drawing, also for the activation of the associated processing unit.

The addressing line which is being used for such activation is specific to the structural component. This means that a different one of the addressing lines A31 to A0 is assigned to each of the various structural components for its activation. In this manner, the respective transmitting structural component is able to determine which ones of the structural components are to simultaneously receive certain data. Consequently, when the mother board includes, as mentioned before, twenty-one of the structural components, twenty-one of the addressing lines A31 to A0 (and of corresponding addressing signals) are required for the addressing of the individual structural components.

In an alternative to the construction of the structural unit 20 as depicted in FIG. 1 of the drawing, which is diagrammatically indicated within the structural unit 16, the buffer storage 30 is not constructed as a shift register; rather, it is constructed as an addressable storage element. In this case, eight of the addressing lines A31 to A0 which are not being used for the activation of the structural components serve for addressing the buffer storage 28. The buffer storage 28 can then also be used as a quick buffer storage, or as a so-called cache storage, for the control unit 22.

The structural component 16 contains the structural elements of the transmitting structural component 18, as well as those of the receiving structural component 20, so that it is suited for operation both in a transmitting and in a receiving mode of operation. An intermediate or buffer storage 28" is connected with eight of the addressing lines A31 to A0 which are separate and distinct from those of the addressing lines A31 to A0 that are being used for conveying the activating signals, as well as with an activating addressing line which corresponds to the address of the structural component 16. The switching-over of the data lines D31 to D0, of the feedback line DTACK and of the data clock line DS from the transmitting mode of operation to the receiving mode of operation is diagrammatically indicated by a switch 32". In the illustration of FIG. 1 of the drawing, the switch 32" is controlled by a control unit 22". During the operation in the transmitting mode, the clock signal control is accomplished by a clock generator 24" which is connected in a manner corresponding to that described above in conjunction with the clock generator 24 of the structural unit 18. In the illustrated implementation of the structural unit 16, there is not provided any multiplexing operation for the data lines D31 to D0.

When the structural component 16 operates in the transmitting mode, the data bus of the control unit 22" is directly connected via the switch 32" with the bus 12. Furthermore, one output of the clock generator 24" is connected with the data clock line DS of the bus 12. In this operating condition, the feedback signal which is present at the feedback line DTACK of the bus 12 is directly supplied through the switch 32" to the control unit 22". During the operation of the structural component 16 in the receiving mode, the switch 32" assumes the lower one of its positions that are indicated in FIG. 1 of the drawing in dotted lines. Under these circumstances, the data appearing at the data lines D31 to D0 are being presented to the buffer register 28". The control of the transfer of such data is accomplished in the manner described above in conjunction with the structural component 20, employing the transfer logic element 30" and the data clock signal appearing at the data clock line DS.

The structural component 14 is of a construction and operation corresponding to those of the structural component 16, so that the same reference numerals as before but supplemented with a single, rather than a double, prime will be used to identify the corresponding elements thereof.

The transfer logic element 30 and the outputs of the switches 30' and 30" which correspond to the outputs of the transfer logic elements 30' and 30" are all constructed as open collector outputs. In this manner, it is possible to galvanically connect the feedback lines DTACK of all of the receiving structural elements in the bus 12.

To the aforementioned non-illustrated control lines, there also belongs an error signal line BERR. The error signal which is carried by this error signal line BERR is generated asynchronously with respect to the construction that has been described above and illustrated in FIG. 1 by the respective receiving structural element when its receiving logic element detects the existence of an error. The error signal is then perceived by the respective transmitting structural component, and the transmitting structural component then repeats the transmission at a later point in time.

Figure 2:
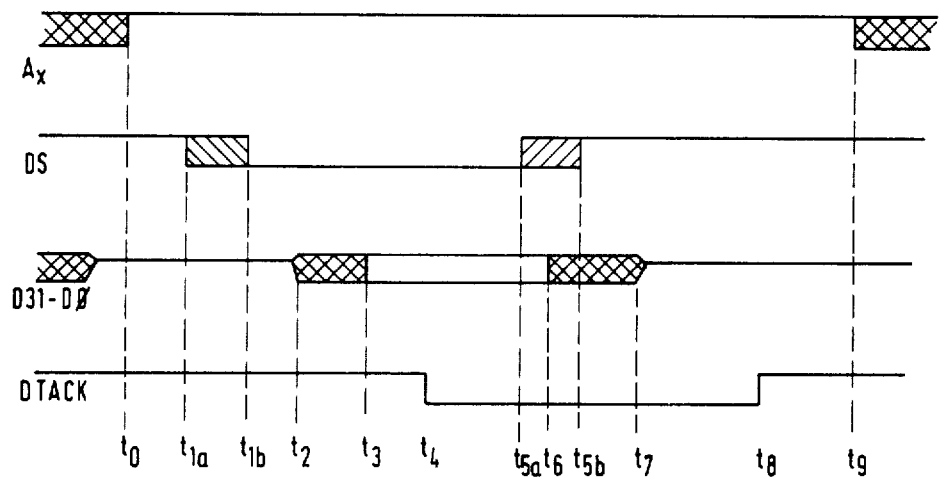
FIG. 2 is a diagrammatic representation of the occurrence of various signals that are utilized in the performance of the method of the present invention, in dependence on elapsed time.

It may be seen in the timing diagram which is illustrated in FIG. 2 of the drawing that at a first instant of time t0 the transmitting structural element generates the addressing signal for the respective receiving structural element. The data clock signal is issued by the transmitting structural element to the data clock line DS at the earliest 35 ns after the generation of the addressing signal, for instance at the instant of time t1a. In the event that different data clock signals are being issued in a multiplexed data bus system, a second data clock signal may be issued, for instance, at the instant of time t1b. Herein, the time offset between the earliest data clock signal and the latest data clock signal, that is the time interval between the instant of time t1a and the instant of time t1b, should not exceed 10 ns at the transmitting structural element, and the corresponding time interval for the receiving unit, inclusive of possible gate delays, should not exceed 20 ns.

Simultaneously with or a short time after the presentation of the data clock signal, at the point of time t2, the data lines D0 to D31 achieve their activated states. At the instant of time t3, the signals appearing at the data lines D0 to D31 assume their binary states that are determined by the transmitting structural element. From this instant of time on, the values of the data signals appearing on the data lines D0 to D31 can be accepted by the respective receiving structural element. At the instant of time t4, the receiving structural component issues a feedback signal to the feedback line DTACK to indicate that a data transfer has taken place. This should not occur any sooner than 200 ns after the presentation of the data clock signal to the data clock line DS at the instant of time t1a or t1b.

In the event that the data transfer was not successful, be it because a storage capacity overflow has been encountered at a receiving structural component or because of other reasons, the respective receiving structural component issues the error signal BERR. This occurs within 150 ns after the issuance of the data clock signal to the data clock signal line DS, so that an error can be recognized under all circumstances.

The data clock signal appearing at the data clock line DS can then be terminated again at the instant of time t5a. This must not occur before the feedback signal is issued. A possible further data clock signal can then be terminated at the instant of time t5b, but even this must not occur prior to the instant of time t4.

Immediately following the termination of the data clock signal supplied to the data clock line DS at the instant of time t5a, the data signals appearing at the data lines D31 to D0 may assume any arbitrary values at the point of time t6. At the instant of time t7, the signals appearing at the data lines D31 to D0 may then assume an undefined condition. Thus, when the bus drivers are three-state switching circuits, then such switching circuits may be switched off. The aforementioned instant of time t6 may occur either before or after the instant of time t5b at which the data clock signal appearing at the data clock line DS is terminated. After the termination of the data clock signal at the point of time t5b, even the feedback signal supplied to the feedback line DTACK can be terminated again at the point of time t8. The same also applies to the addressing signal; however, the transmitting structural component should wait for at least 10 ns between the termination of the data clock signal at the instant of time t5b and the instant of time t9 at which the addressing signal is terminated.

The present invention can be particularly advantageously used in a multiprocessor system, wherein processors of the same type and of different types can be used to the same advantage. In a particularly advantageous manner, it is possible to synchronize processors of the same type with respect to one another. For instance, interrupts to the receiving structural components can be triggered exactly at the same time instant, so that the operations performed by the receiving structural components proceed fully in parallelism with one another In this manner, it is possible to avoid the otherwise existing possibility that a time shift would be encountered between first and the last addressed structural component. This time shift was heretofore required for the performance of the plurality of bus cycles which were needed in each instance for the data transfer to the respective receiving structural component.

So, when there are provided, for instance, as mentioned before, twenty of the receiving structural components, the heretofore required more than one-hundred of the bus cycles can now be eliminated.

Furthermore, while heretofore the number of the various interrupts encountered during the sequential data transfer determined the maximum number of the receiving structural components for the data transfer in the aforementioned sense (for instance seven in the microprocessor designated as 68 020), this limitation is avoided by using the present invention.

A further possible application of the present invention resides in the status coordination of various processors in a multiprocessor system. Up to now, the status bits have been set in a global storage register, and each of the processors had to be able to access these bits. When, for instance, one of the processors intended to utilize an operating device and, to achieve this purpose, has changed the corresponding status bit, then reading cycles had to occur at all the other processors to apprise them of the fact that this particular operating device is now in use. After the termination of the use of the particular operating device by the respective processor, the entire cycle had to be repeated once more. Such status management activities consume a considerable portion of the bus time.

By resorting to the features of the present invention, it is now possible to provide the information about the operating device usage to all of the processors simultaneously and in a much shorter time period than before, by performing a "message-passing" cycle in accordance with the present invention. In this manner, it is also possible to achieve that the supervision function is no longer limited to a master processor.

A further use of the present invention is in the construction of an error-tolerating computer system, in that each of the processor structural components can be informed about the virtual or actual status of each other of the structural components. In this manner, it is possible to recognize failures not only due to non-reacting, but also due to improperly reacting, structural components.

The real time behavior of a multiprocessor system can be considerably improved. So, for instance, even when ten processor structural components are installed in a particular system, instead of the above-mentioned twenty-one, the interrupt processing actually can be accomplished and concluded within a very short time period of, for instance, one microsecond, whereas a time period amounting to at least ten time as much had to be expected in heretofore known computer systems of the same size.

While the present invention has been described and illustrated herein as embodied in a specific construction of a multiprocessor system, it is not limited to the details of this particular construction, since various modifications and structural changes are possible and contemplated by the present invention. Thus, the scope of the present invention will be determined exclusively by the appended claims.

What is claimed is:

1. A method for transferring data between structural components, especially those of a multiprocessor system, wherein (the) at least one initiating structural component is capable of initiating the data transfer and a plurality of receiving structural components is capable of being addressed independently from each other by an unique addressing signal supplied by said initiating component, wherein said initiating component transfers the data to a plurality of receiving components using addressing signals for the addressing of the respective receiving component supplied to and transferred via a bus system and wherein each receiving component being addressed issues at least one feedback signal acknowledging the data transfer that has occurred, the improvement residing in that at least two of said receiving components are addressed simultaneously, the data issued by said initiating component is supplied to the thus addressed receiving components simultaneously; and said feedback signals of said two receiving components are logically coupled with each other, supplying the logical result thereof to said initiating component.

2. The method as defined in claim 1, wherein the feedback signal is issued by each of the receiving structural components within a time period that is determined by the bus system when the data transfer was successful.

3. The method as defined in claim 2, wherein said time period is between 30 and 100 ns.

4. The method as defined in claim 1, wherein the receiving component which is addressed by said initiating component stores an error indication in a storage register thereof when such receiving structural element is unable to issue the feedback signal in time, and wherein the contents of said storage register can be read by the other structural components, especially by the structural component which has initiated the data transfer.

5. The method as defined in claim 4, wherein the respective receiving structural element issues an error signal within a predetermined time period when the data transfer is unsuccessful.

6. The method as defined in claim 1, wherein the addressing signals of the bus system that are not needed for addressing the structural components are used for addressing sub-units of the receiving structural components.

7. The method as defined in claim 1, wherein the structural component that initiates the data transfer is also capable of being used as a receiving structural component, and wherein at least a portion of the respective receiving structural component is also capable of being used as a structural group that initiates the data transfer.

8. The method as defined in claim 1, wherein the feedback signal is issued at the earliest at a predetermined time instant occurring after the occurrence of a data clock signal which is issued by the structural component that initiates the data transfer after it has reliably presented at least the addressing signals at an output system thereof, said predetermined time instant occurring after the expiration of a predetermined time period during which the respective receiving structural component is capable of issuing an error signal in the event that an error is encountered.

9. The method as defined in claim 8, wherein said predetermined time instant occurs 200 ns after the issuance of the data clock signal.

10. The method as defined in claim 8, wherein said predetermined time period amounts to 150 ns.

11. A multiprocessor system of the type including at least one initiating structural component capable of initiating a transfer of data, and a plurality of receiving structural components capable of receiving the data being transferred, wherein said structural components are connected with one another by a bus system including data lines, addressing lines via which each structural component is capable of being uniquely addressed so that the respective receiving component that is addressed by its addressing signal reads the data presented at the data lines of the bus system, and a feedback line leading from the respective receiving component to the initiating component for acknowledging any data transfer that has occurred, comprising means, in said initiating component, for at least two of the addressing lines and through the latter to the associated receiving components to activate the latter simultaneously, and means for logically coupling said feedback lines for connecting the respective receiving components with one another and for supplying said logical result to said initiating component for synchronizing the activity of said receiving components.

12. The multiprocessor system as defined in claim 11, wherein said connecting means incorporates elements from an open collector or tristate technology.

13. The multiprocessor system as defined in claim 11, wherein the receiving structural components include respective buffer storage registers which temporarily store all the data within a short period of time after the stabilization of the data signals.

14. The multiprocessor system as defined in claim 13, wherein said period of time amounts to 40 ns.

15. The multiprocessor system as defined in claim 11, wherein the receiving structural components include buffer storage registers from which the data can be immediately retrieved.

16. The multiprocessor system as defined in claim 11, wherein the receiving structural components include buffer storage registers each of which includes several stages and which initially issues the data received thereby first and subsequently issues the data received thereby later.

17. The multiprocessor system as defined in claim 11, comprising at least two identically constructed receiving structural components, especially processor units, whose-activity is synchronized by the simultaneously received data signals.

18. An apparatus for providing simultaneous intercommunication between a first, a second and a third circuit component interconnected by a bus system including data paths, addressing paths and control paths, with each circuit component responsive to a unique address signal associated with each particular circuit component, comprising:

means, coupled to a particular one of the first, second and third circuit components, for initiating a transfer of data from said particular one circuit component to both circuit components other than said particular one circuit component, said initiating means further comprising:

means for asserting simultaneously to said both circuit components their associated unique addresses; and means for receiving a master acknowledge signal from said both circuit components;

each circuit component of said both circuit components further comprising:

means for detecting said unique address signal of said associated circuit component and for asserting an active signal;

means, responsive to said active signal, for storing a predetermined amount of data;

means, responsive to a control signal, for asserting an acknowledge signal; and a control circuit, responsive to receipt of data received from said particular one circuit component during said transfer of data, for asserting said control signal to said asserting means when a prespecified condition of said data is identified.

* * * * *